(12) United States Patent
Yoo

(10) Patent No.: US 12,324,541 B2
(45) Date of Patent: Jun. 10, 2025

(54) COFFEE GRINDER HAVING IMPROVED ACCURACY OF BURR ALIGNMENT FOR GRINDING UNIFORMITY

(71) Applicant: In Oh Yoo, Siheung-si (KR)

(72) Inventor: In Oh Yoo, Siheung-si (KR)

( * ) Notice: Subject to any disclaimer, the term of this patent is extended or adjusted under 35 U.S.C. 154(b) by 241 days.

(21) Appl. No.: 18/025,387

(22) PCT Filed: Sep. 15, 2021

(86) PCT No.: PCT/KR2021/012615
§ 371 (c)(1),
(2) Date: Mar. 8, 2023

(87) PCT Pub. No.: WO2022/060093
PCT Pub. Date: Mar. 24, 2022

(65) Prior Publication Data
US 2023/0346165 A1   Nov. 2, 2023

(30) Foreign Application Priority Data

Sep. 18, 2020   (KR) .................. 10-2020-0120759

(51) Int. Cl.
| | |
|---|---|
| *A47J 42/20* | (2006.01) |
| *A47J 42/16* | (2006.01) |
| *A47J 42/18* | (2006.01) |
| *A47J 42/26* | (2006.01) |
| *A47J 42/28* | (2006.01) |

(52) U.S. Cl.
CPC ............... *A47J 42/20* (2013.01); *A47J 42/16* (2013.01); *A47J 42/18* (2013.01)

(58) Field of Classification Search
CPC .. A47J 42/20; A47J 42/16; A47J 42/18; A47J 42/26; A47J 42/28
See application file for complete search history.

(56) References Cited

U.S. PATENT DOCUMENTS

| | | | |
|---|---|---|---|
| 2005/0279219 A1* | 12/2005 | Turi | .................. A47J 31/42 99/286 |
| 2022/0071438 A1* | 3/2022 | Harbers | .............. A47J 31/5251 |
| 2023/0355038 A1* | 11/2023 | Hensel | ................... A47J 42/10 |

\* cited by examiner

*Primary Examiner* — Mohammed S. Alawadi
(74) *Attorney, Agent, or Firm* — Heedong Chae; Lucem, PC

(57) ABSTRACT

Disclosed is a coffee grinder having improved accuracy of burr alignment for grinding uniformity. The coffee grinder having improved accuracy of burr alignment for grinding uniformity of the present disclosure comprises: a lower flat burr carrier having a rotary base part rotatably coupled to a grinder body and a lower flat burr part coupled to the rotary base part so as to rotate together with the rotary base part and having a first grinding blade; and an upper flat burr carrier that is coupled to a fixed coupling part provided on the grinder body and grinds introduced coffee beans together with the first grinding blade, wherein the lower flat burr part is coupled to the side of the rotary base part.

7 Claims, 10 Drawing Sheets

COFFEE GRINDER HAVING IMPROVED ACCURACY OF BURR ALIGNMENT FOR GRINDING UNIFORMITY

CROSS-REFERENCE TO RELATED APPLICATIONS

This application claims the priority of Korean Patent Application No. 10-2020-0120759 filed on Sep. 18, 2020, in the Korean Intellectual Property Office, the disclosure of which is incorporated herein by reference.

BACKGROUND OF THE INVENTION

Field of the Invention

The present disclosure relates to a coffee grinder, and more particularly, to a coffee grinder capable of ensuring grinding uniformity of coffee beans by improving the accuracy of burr alignment for grinding the coffee beans.

Description of the Related Art

Recently, as the demand for coffee increases, coffee beans, which can feel the unique flavor and taste of coffee, are widely consumed instead of instant coffee.

In general, coffee beans are prepared by pouring hot water into pulverized bean powder, dripping while passing through the bean powder, and extracting the coffee bean liquid.

As the interest and demand for coffee beans increase, the case of directly grinding the beans with a bean grinder at home, offices, and outdoors is greatly increasing.

In addition, the demand for a coffee bean vending machine that manufactures coffee beans by directly grinding coffee beans with a built-in coffee bean grinder is gradually expanding.

Conventional coffee bean grinder includes a grinder housing into which beans are introduced, and a grinding blade rotatably positioned in the grinder housing, so that the beans introduced into the grinder housing are ground between the grinder housing and the grinding blade by rotation of the grinding blade.

Coffee grinders for cutting or grinding coffee beans grind the coffee beans in various methods according to the shape of the blade, and among them, conical burrs and flat burrs are representative.

In a traveling direction of the ground coffee beans, the coffee beans are discharged from top to bottom in the conical burr, and discharged sideways by centrifugal force in the flat burr.

On the other hand, the conventional flat burr has a hole in the upper burr and the lower burr, so the flat burr is attached to a burr carrier and coupled with a bolt or has a structure in which a hole is made and attached to a back side using a magnet.

Such a structure has a problem in that the separation occurs as the coffee powder permeates into the coupling part, small foreign substances, shock, or motor vibration (movement by impact while grinding).

And, for the gap between the upper burr and the lower burr, a spring or a worm gear is mainly used. In this case, the spring is not precise, and coffee powder, etc. enters the hole where the spring is physically inserted, and the precision is lowered, so the taste of the coffee beans may be deteriorated.

In addition, there is a disadvantage that when the grinding control ring is turned, the coffee beans do not move smoothly during rotation compared to the magnet.

The foregoing technical configuration is a background technology to aid understanding of the present disclosure, and does not mean the prior art widely known in the technical field to which the present disclosure belongs.

SUMMARY OF THE INVENTION

Accordingly, a technical object to be achieved by the present disclosure is to provide a coffee grinder capable of ensuring grinding uniformity of coffee beans by improving the accuracy of burr alignment of grinding the coffee beans.

According to an aspect of the present disclosure, a coffee grinder may be provide, which includes: a lower flat burr carrier including a rotary base part rotatably coupled to a grinder body, and a lower flat burr part coupled to the rotary base part, and rotated together with the rotary base part, and having a first grinding blade; and an upper flat burr carrier coupled to a fixed coupling part provided in the grinder body, and grinding input coffee beans jointly with the first grinding blade, in which the lower flat burr part is coupled to a side surface of the rotary base part.

The rotary base part may include a rotary base body in which a bottom portion of the lower flat burr part is supported on an upper surface portion, and a plurality of coupling guide posts provided in the rotary base rotary base body to protrude toward the upper flat burr carrier, and a side wall of the lower flat burr part may be coupled to the plurality of guide posts.

The lower flat burr part may be detachably coupled to the plurality of guide posts by a first fastening member coupled to the side wall of the lower flat burr part through the plurality of guide posts.

The upper flat burr carrier may include an upper base body disposed above the lower flat burr carrier, and an upper flat burr portion coupled to the upper base body, and having a second grinding blade, and the upper flat burr may be coupled to the side wall of the upper base body.

The upper flat burr part may be detachably coupled to the side wall of the upper base body by a second fastening member.

The upper flat burr carrier may further include an upper base flange provided at an upper end portion of the upper base body and coupled to an inner step of the fixed coupling part, a plurality of pin coupling grooves and a plurality of first magnet members may be provided at the inner step, and a plurality of pin members coupled to the plurality of pin coupling grooves and a plurality of second magnet members having a repulsive force with the plurality of first magnet members may be provided on the bottom portion of the base flange.

The coffee grinder may further include a grinding degree adjustment part detachably coupled to the fixed coupling part and adjusting a grinding degree of the coffee beans.

According to exemplary embodiments of the present disclosure, a lower flat burr part is coupled to a side surface of a rotary base part, and prevents coffee beans powder permeating into a coupling portion or the coupling portion from being widened from shock or vibration of a motor to improve the accuracy of burr alignment of grinding coffee beans, thereby ensuring grinding uniformity of the coffee beans.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
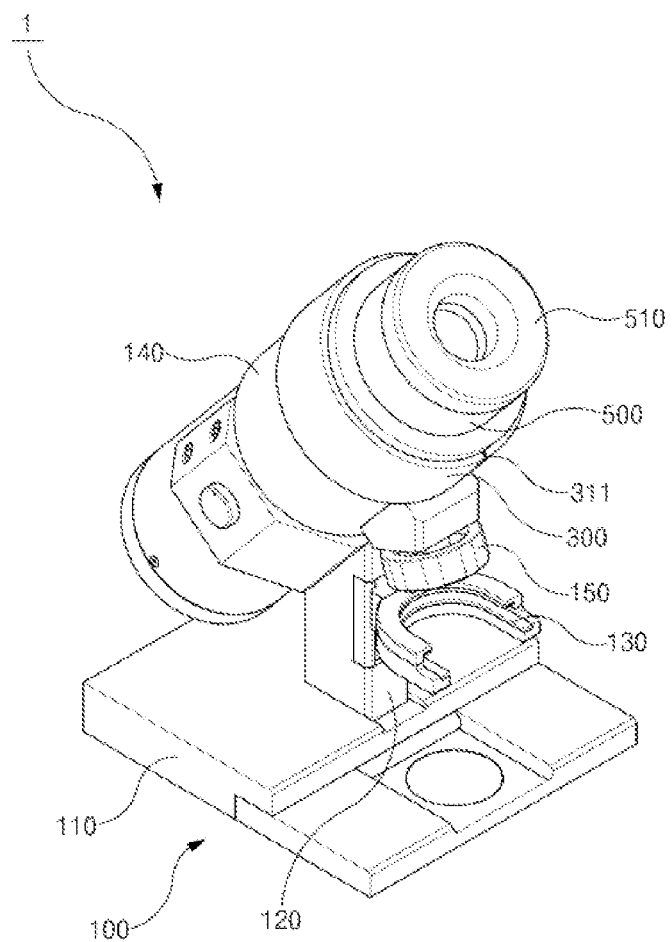
FIG. 1 is a diagram schematically illustrating a coffee grinder having improved accuracy of burr alignment for grinding uniformity according to an exemplary embodiment of the present disclosure.

In order to sufficiently appreciate operational advantages of the present disclosure and objects achieved by an exemplary embodiment of the present disclosure, accompanying drawings illustrating the exemplary embodiments of the present disclosure and contents disclosed in the accompanying drawings should be referred.

Hereinafter, a preferred embodiment of the present disclosure will be described in detail with reference to the accompanying drawings to described the present disclosure in detail. Like reference numerals presented in each drawing refer to like members.

Figure 2:
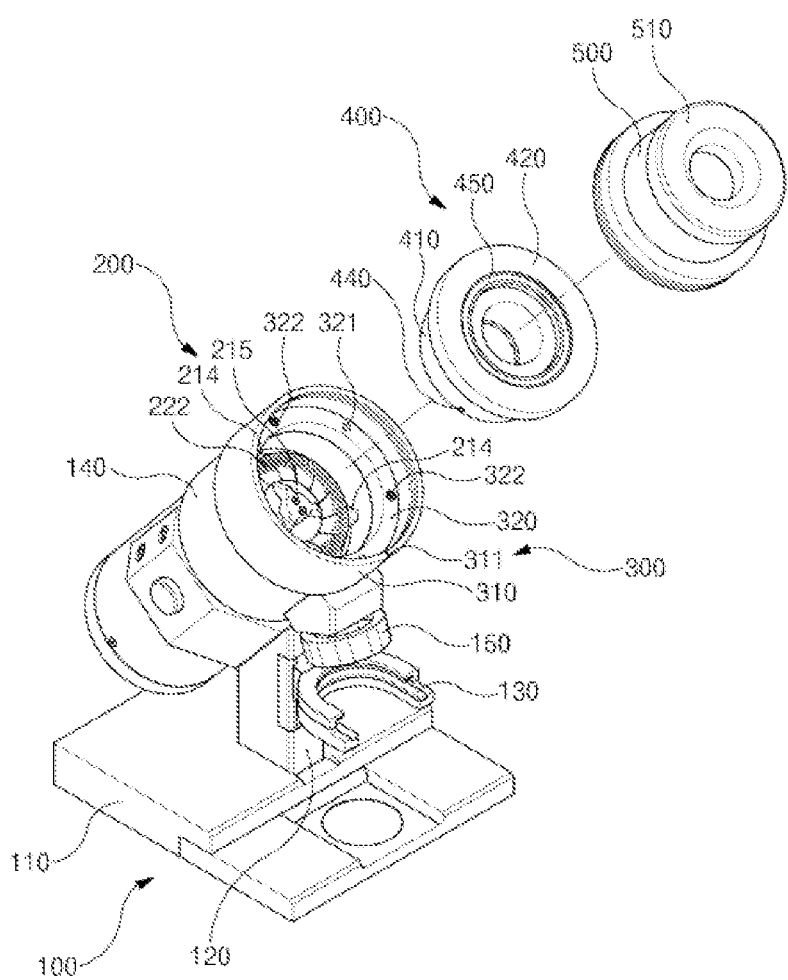
FIG. 2 is an exploded perspective view of FIG. 1.
Figure 3:
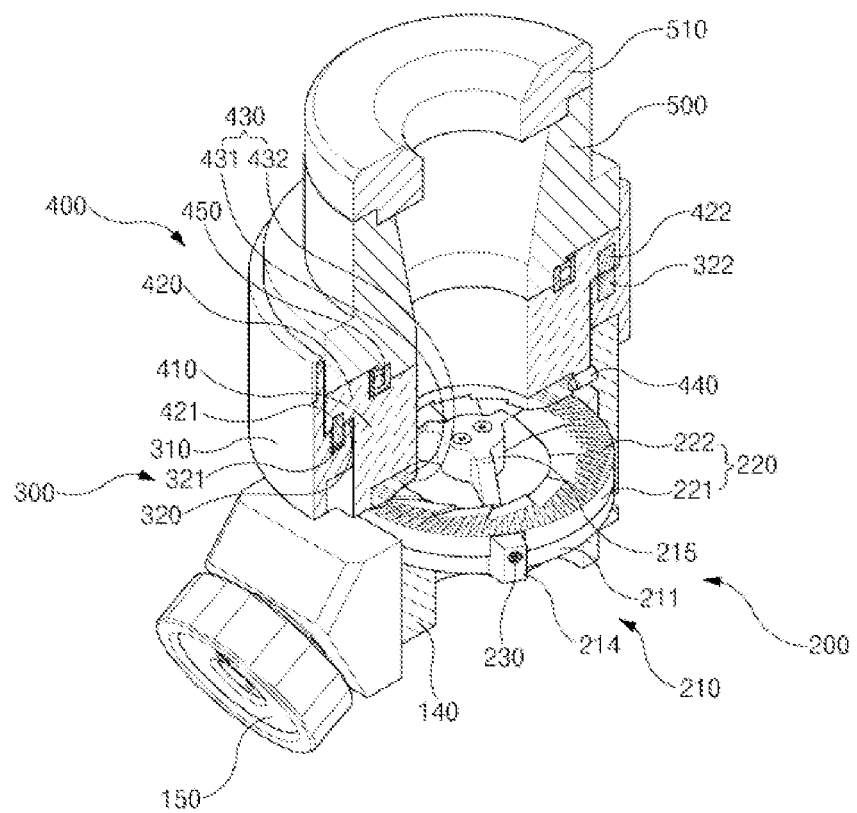
FIG. 3 is a partial cut-out view of a main part illustrated in FIG. 1.
Figure 4:
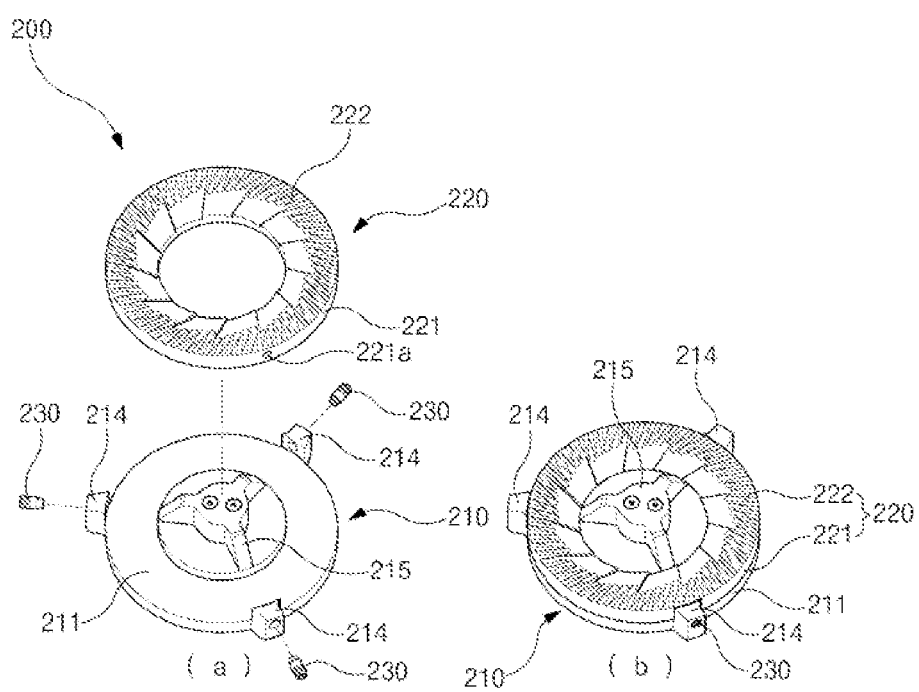
FIG. 4 is a diagram illustrating a lower flat burr carrier illustrated in FIG. 3.
Figure 5:
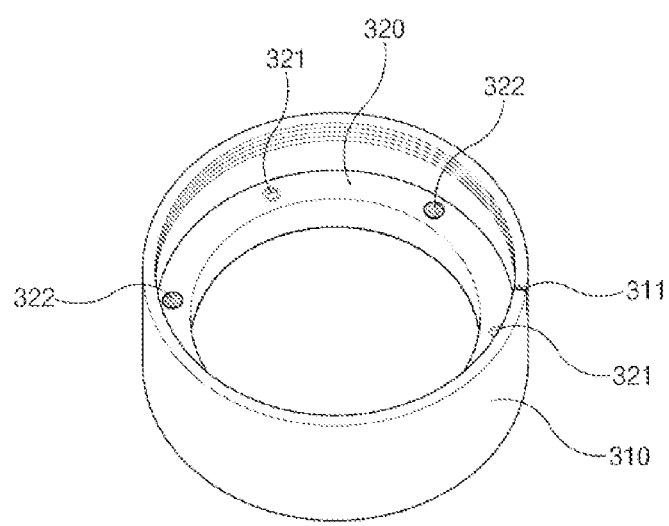
FIG. 5 is a perspective view of a fixed coupling part illustrated in FIG. 3.

FIG. 1 is a diagram schematically illustrating a coffee grinder having improved accuracy of burr alignment for grinding uniformity according to an exemplary embodiment of the present disclosure, FIG. 2 is an exploded perspective view of FIG. 1, FIG. 3 is a partial cut-out view of a main part illustrated in FIG. 1, FIG. 4 is a diagram illustrating a lower flat burr carrier illustrated in FIG. 3, and FIG. 5 is a perspective view of a fixed coupling part illustrated in FIG. 3.

Figure 6:
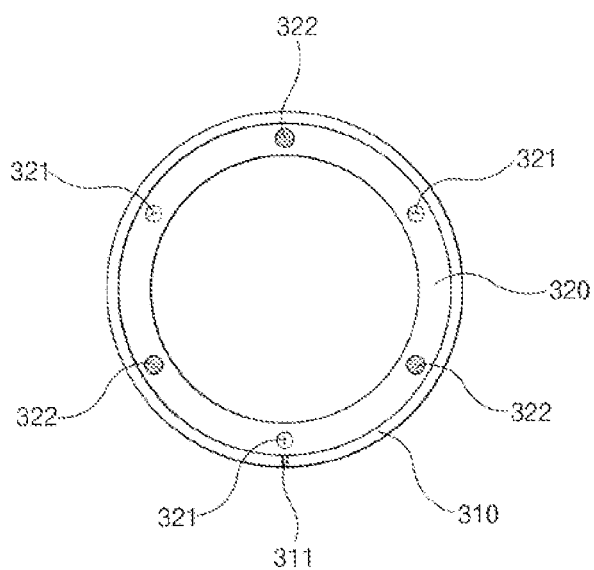
FIG. 6 is a bottom view of FIG. 5.
Figure 7:
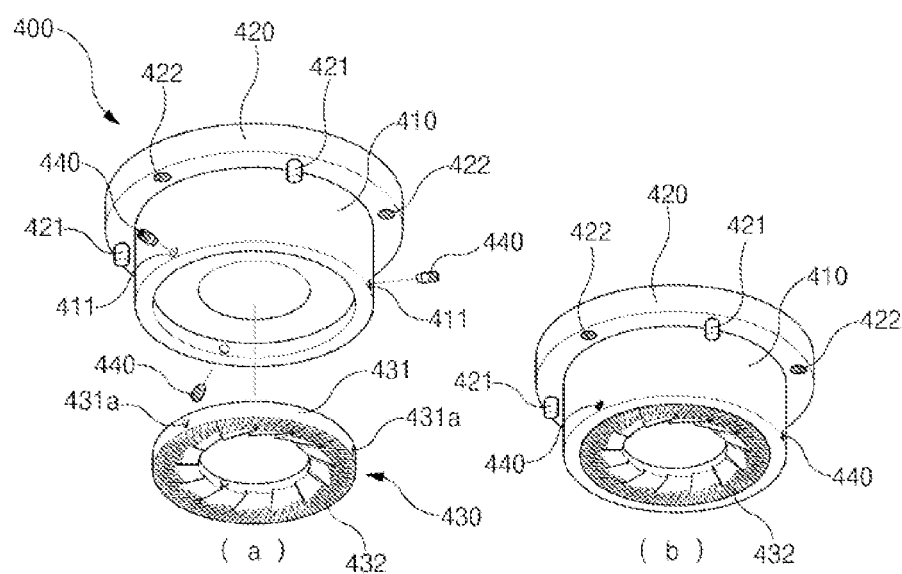
FIG. 7 is a diagram illustrating an upper flat burr carrier illustrated in FIG. 3.
Figure 8:
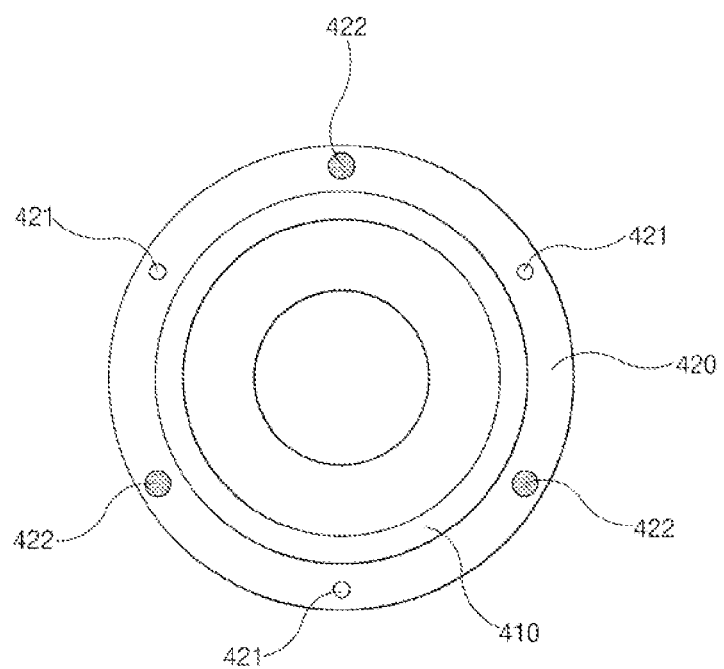
FIG. 8 is a bottom view of an upper base body and an upper base flange illustrated in FIG. 7.
Figure 9:
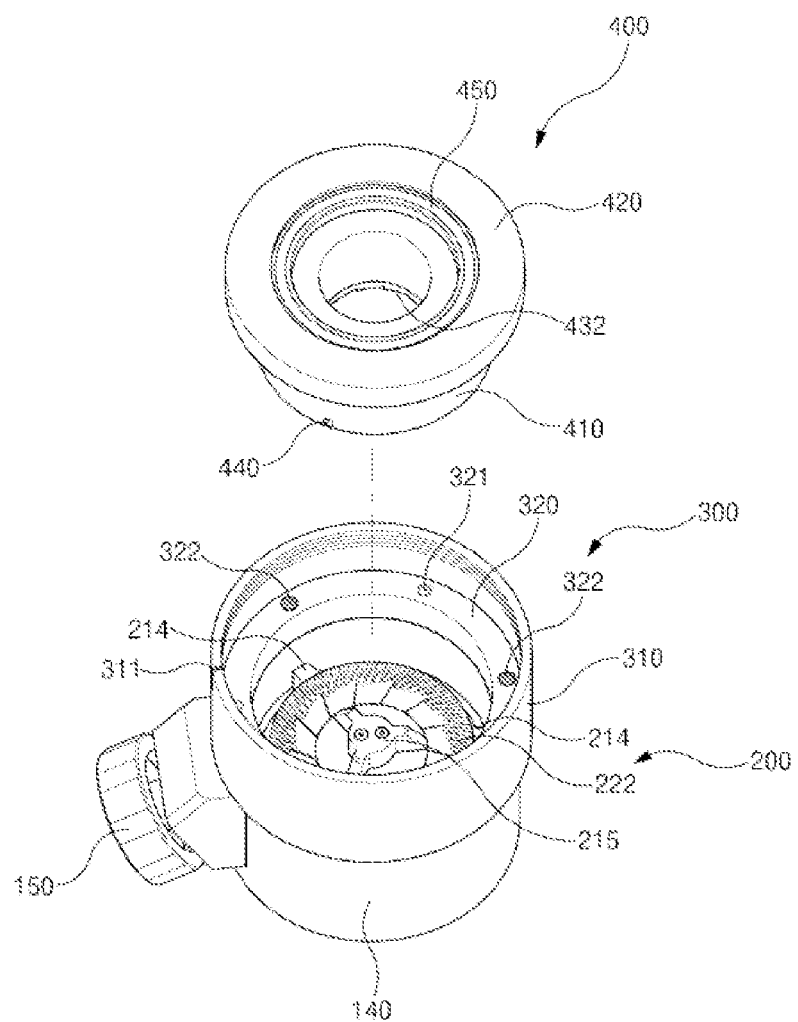
FIG. 9 is a diagram illustrating that the upper flat burr carrier is exploded from an area of the lower flat burr carrier illustrated in FIG. 2.
Figure 10:
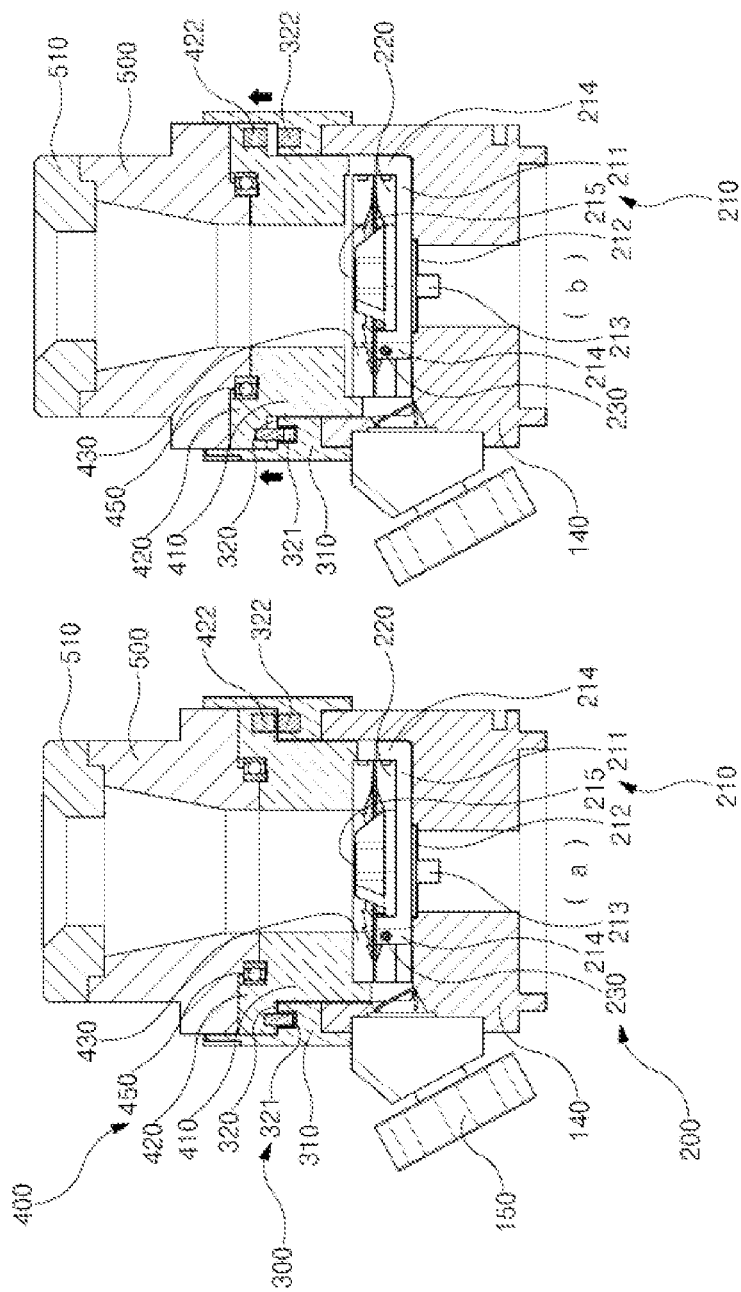
FIG. 10 is a cross-sectional view illustrating that the upper flat burr carrier illustrated in FIG. 3 is coupled to the fixed coupling part.

In addition, FIG. 6 is a bottom view of FIG. 5, FIG. 7 is a diagram illustrating an upper flat burr carrier illustrated in FIG. 3, FIG. 8 is a bottom view of an upper base body and an upper base flange illustrated in FIG. 7, FIG. 9 is a diagram illustrating that the upper flat burr carrier is exploded from an area of the lower flat burr carrier illustrated in FIG. 2, and FIG. 10 is a cross-sectional view illustrating that the upper flat burr carrier illustrated in FIG. 3 is coupled to the fixed coupling part.

As illustrated in these figures, the coffee grinder 1 having improved accuracy of burr alignment for grinding uniformity according to the exemplary embodiment includes a grinder body 100, a lower flat burr carrier 200 rotatably provided inside the grinder body 100, a fixed coupling part 300 coupled to the grinder body 100, an upper flat burr carrier 400 coupled to the fixed coupling part 300 and grinding coffee beans jointly with the lower flat burr carrier 200, and a grinding degree adjustment part 500 coupled to the fixed coupling part 300 and adjusting a grinding degree of coffee beans.

As illustrated in FIG. 1, the grinder body 100 includes abase frame 110, a support post 120 provided on an upper surface portion of the base frame 110, a cradle 130 provided in the support post 120 and provided as a support place of a container containing ground coffee beans, a housing 140 provided at an upper end portion of the support post 120 and rotatably supporting the lower flat burr carrier 200 therein, and a discharge part 150 detachably coupled to the housing 140 and provided as a discharge passage of the ground coffee beans.

In the exemplary embodiment, a driving motor (not illustrated) connected to the lower flat burr carrier 200 and rotating the lower flat burr carrier 200 may be provided inside the housing 140.

In addition, in the exemplary embodiment, the discharge part 150 may be detachably screw-coupled to the housing 140.

As illustrated in FIG. 3, the lower flat burr carrier 200 may be provided inside the housing 130, and connected to the driving motor provided in the housing 140 and selectively rotated in a clockwise direction or a counterclockwise direction, and grind the coffee beans jointly with the upper flat burr carrier 400.

In the exemplary embodiment, as illustrated in FIG. 3, the lower flat burr carrier 200 may include a rotary base part 210 disposed inside the housing 140, and rotated in connect to the driving motor, a lower flat burr part 210 detachably coupled to the rotary base part 210 and grinding the coffee beans jointly with the upper flat burr part 430, and a fastening member 230 detachably coupling the lower flat burr part 220 to the rotary base part 210.

As illustrated in FIG. 4, the rotary base part 210 of the lower flat burr carrier 200 includes the rotary base body 211, a rotating protrusion part 212 provided on a bottom portion of the rotary base body 211 to protrude downward and supported on a groove of the housing 140 as illustrated in FIG. 10, a rotational shaft 213 provided on the bottom portion of the rotating protrusion part 212 to protrude downward and connected to the driving motor, a plurality of coupling guide posts 214 provided in the rotary base body 211 to protrude upward from the rotary base body 211 and provided as a coupling place of a first body 221 as illustrated in FIG. 4, and a dispersing protrusion part 215 provided to protrude upward from a central upper surface portion of the rotary base body 211 and dispersing input coffee beans toward a first grinding blade 222.

In the exemplary embodiment, as illustrated in FIG. 4, three coupling guide posts 214 may be provided on the side wall of the rotary base body 211 at equal intervals.

In addition, in the exemplary embodiment, a lower flat part may be detachably coupled to the plurality of coupling guide posts 214 by the first fastening member 230 coupled to the first body 221 through holes provided in the plurality of coupling guide posts 214.

Furthermore, in the exemplary embodiment, the plurality of coupling guide posts 214 may be supported on the side wall of the first body 221.

In the exemplary embodiment, there is an advantage in that the lower flat part 220 is coupled to the plurality of coupling guide posts 214 of the rotary base part 210, that is, coupled to the side surface of the rotary base part 210, and prevents coffee beans powder from being permeated into a coupling portion between both sides and the coupling portion from being widened due to shock or vibration of the motor to improve the accuracy of the burr alignment for grinding the coffee beans. In other words, it is possible to perfectly solve a horizontal problem of the burr, which is the most problematic in the burr alignment.

Specifically, fixing the burr by making a hole above the burr has problems with horizontality because fixing the burr may not fundamentally make the torque for fixing the screw constant, but as in the exemplary embodiment, when the lower flat burr part 220 is coupled to the plurality of coupling guide posts 214 of the rotary base part 210, that is, coupled to the side surface of the rotary base part 210, the lower flat burr part 220 may be prevented from being inclined horizontally. A first grinding blade 222 and a second grinding blade 432 applied to the exemplary embodiment are greatly affected by burr alignment even though they are horizontally tilted in units of 0.01 mm, but the horizontal problem of the burr may be perfectly solved by the above-mentioned side coupling scheme. This may also be equally applied to the upper flat burr part 430 to be described later.

As illustrated in FIG. 4, the lower flat burr part 220 of the lower flat burr carrier 200 includes the first body 221 provided on the upper surface portion of the rotary base body 211 and having the side wall detachably coupled to the plurality of coupling guide posts 214 through a first coupling groove 221a, and the first grinding blade 222 provided on the upper surface portion of the first body 221.

As illustrated in FIG. 4, the first fastening member 230 of the lower flat bur carrier 200 may be detachably screw-coupled to the first coupling groove 221a provided in the first body 221 by a thread provided on an outer wall. In the exemplary embodiment, a V-line periphery may be made instead of the first coupling groove 221a, and the first body 221 may also be coupled to the V-line periphery through the first fastening member 230. The V-line periphery may be replaced with other known coupling means, and the first coupling groove 221a may also be replaced alone.

In the exemplary embodiment, the first fastening member 230 may include a dog point type screw.

As illustrated in FIG. 10, in the fixed coupling part 300, a lower portion may be coupled to the housing 140, and the upper base body 410 and the grinding degree adjustment part 500 may be sequentially coupled to an upper portion.

In the exemplary embodiment, as illustrated in FIG. 5, the fixed coupling part 300 includes a ring-shaped fixed coupling body 310, and an inner step 320 provided on the inner wall of the fixed coupling body 310.

As illustrated in FIG. 5, the fixed coupling body 310 of the fixed coupling part 300 is provided with a cut-out portion 311 so that the user may recognize a specific position of the fixed coupling body 310.

As illustrated in FIGS. 5 and 6, a plurality of pin coupling grooves 321 and a plurality of first magnet members 322 may be provided on the inner step 320 of the fixed coupling part 300, and a plurality of pin members 421 coupled to the plurality of pin coupling grooves 321 and a plurality of second magnet members 422 having a repulsive force with the plurality of first magnet members 322 may be provided on the bottom portion of the upper base flange 420. In the exemplary embodiment, the plurality of first magnet members 322 and the plurality of second magnet members 422 are repulsive to each other, so that the lower flat bar carrier 200 and the upper flat bar carrier 400 may be separated by a magnetic levitation scheme. Therefore, when adjusting the grinding degree, a gap between the lower flat part 220 and the upper flat burr part 430 may be adjusted without interference by simply rotating the grinding degree adjustment part 500.

In the exemplary embodiment, 4 to 6 first magnet members 322 and second magnet members 422 may be provided for efficient magnetic levitation.

As illustrated in FIG. 3, the upper flat burr carrier 400 is coupled to the fixed coupling part 300, and serves to grind the coffee beans jointly with the lower flat burr part 220 at a fixed position.

In the exemplary embodiment, as illustrated in FIG. 3, the upper flat burr carrier 400 includes an upper base body 410 disposed above the lower flat burr carrier 200, an upper base flange 420 provided at an upper end portion of the upper base body 410 and coupled to the inner step 320 of the fixed coupling part 300, an upper flat part 430 coupled to the upper base body 410 and having two grinding blades, a plurality of second fastening members 440 detachably coupling the upper flat burr part 430 to the upper base body 410, and a bearing member 450 coupled to the upper base body 410.

As illustrated in FIG. 7, the upper base body 410 of the upper flat burr carrier 400 may have a cylindrical shape which is empty inside, and the body coupling groove 411 to which the second fastening member 440 is screw-coupled may be provided below the upper base body 410.

As illustrated in FIG. 7, the upper base flange 420 of the upper flat burr carrier 400 is provided with a larger diameter than the upper base body 410, and a plurality of pin members 421 and a plurality of second magnet members 422 may be provided on the bottom portion of the upper base flange 420 to be spaced apart from each other.

In the exemplary embodiment, as illustrated in FIG. 10, the plurality of pin members 421 are inserted into and coupled to the pin coupling grooves 321 provided in the fixed coupling part 300, and the plurality of second magnet members 422 may be coupled to the plurality of first magnet members 322 provided in the fixed coupling part 300 by action of the repulsive force.

As illustrated in FIG. 7, the upper flat bur portion 430 of the upper flat bur carrier 400 includes a second body 431 of which side wall is detachably coupled to the inner wall of the upper base body 410 by the second coupling groove 431a, and a second grinding blade 432 provided on the bottom portion of the second body 431 in the direction of the first grinding blade 222 and grinding the coffee beans jointly with the first grinding blade 222.

In the exemplary embodiment, the upper flat bur portion 430 is coupled to the upper base body 410 through the side wall, that is, the side wall of the second body 431, which prevents the coffee powder from permeating the coupling portion between both sides or the coupling portion from being widened due to shock or vibration of the motor to improve the accuracy of the bur alignment for grinding the coffee beans.

As illustrated in FIG. 7, the second fastening member 440 of the upper flat burr carrier 400 may be detachably screw-coupled to the second coupling groove 431a provided in the second body 431 by the thread provided on the outer wall.

In the exemplary embodiment, the second fastening member 440 may include a dog point type screw.

As illustrated in FIG. 10, the bearing member 450 of the upper flat burr carrier 400 may be provided on the upper surface portion of the upper base body 410 to support rotation of the grinding degree adjustment part 500.

The grinding degree adjustment part 500 may be disposed above the upper flat bur carrier 400 and detachably screw-coupled to the fixed coupling part 300.

In the exemplary embodiment, an inlet 510 into which the coffee beans are input may be provided above the grinding degree adjustment part 500.

In the exemplary embodiment, since the grinding degree adjustment part 500 is screw-coupled to the fixed coupling part 300, turning the grinding degree adjustment part 500 in one direction, for example clockwise, causes the grinding degree adjustment part 500 to move the upper flat bur carrier 400 down to narrow the gap between the first grinding blade 222 and the second grinding blade 432. In this case, finer ground coffee beans may be obtained.

The present disclosure is not limited to the exemplary embodiments described herein, and it would be apparent to those skilled in the art that various changes and modifications can be made without departing from the spirit and the scope of the present disclosure. Therefore, it should be said that such modifications or variations fall within the scope of the claims of the present disclosure.

The exemplary embodiment can provide a coffee grinder capable of ensuring grinding uniformity of coffee beans by improving the accuracy of burr alignment of grinding the coffee beans.

What is claimed is:

1. A coffee grinder comprising:
    a lower flat burr carrier including a rotary base part rotatably coupled to a grinder body, a lower flat burr part coupled to the rotary base part, the lower flat burr part rotated together with the rotary base part, and the lower flat burr part having a first grinding blade; and
    an upper flat burr carrier coupled to a fixed coupling part provided in the grinder body, and the upper flat burr carrier is configured to grind input coffee beans jointly with the first grinding blade,
    wherein the lower flat burr part is coupled to a side surface of the rotary base part.

2. The coffee grinder of claim 1, wherein the rotary base part includes
    a rotary base body in which a bottom portion of the lower flat burr part is supported on an upper surface portion of the rotary base body, and
    a plurality of coupling guide posts provided in the rotary base body to protrude toward the upper flat burr carrier, and
    a side wall of the lower flat burr part is coupled to the plurality of guide posts.

3. The coffee grinder of claim 2, wherein the lower flat burr part is detachably coupled to the plurality of guide posts by a first fastening member coupled to the side wall of the lower flat burr part through the plurality of guide posts.

4. The coffee grinder of claim 1, wherein the upper flat burr carrier includes:
    an upper base body disposed above the lower flat burr carrier,
    an upper flat burr portion coupled to the upper base body, and the upper flat burr portion having a second grinding blade, and
    the upper flat burr is coupled to a side wall of the upper base body.

5. The coffee grinder of claim 4, wherein the upper flat burr part is detachably coupled to the side wall of the upper base body by a second fastening member.

6. The coffee grinder of claim 4, wherein the upper flat burr carrier further includes an upper base flange provided at an upper end portion of the upper base body and coupled to an inner step of the fixed coupling part,
    a plurality of pin coupling grooves and a plurality of first magnet members are provided at the inner step, and
    a plurality of pin members coupled to the plurality of pin coupling grooves and a plurality of second magnet members having a repulsive force with the plurality of first magnet members are provided on a bottom portion of the base flange.

7. The coffee grinder of claim 1, wherein a grinding degree adjustment part detachably coupled to the fixed coupling part and adjusting a grinding degree of the coffee beans.

* * * * *